United States Patent

[11] 3,587,347

| [72] | Inventors | Carl W. Hanzi<br>Hitchen;<br>James M. Laing, Letchworth, England |
|---|---|---|
| [21] | Appl. No. | 766,427 |
| [22] | Filed | Oct. 10, 1968 |
| [45] | Patented | June 28, 1971 |
| [73] | Assignee | Borg-Warner Limited, Letchworth, Hertfordshire, England |
| [32] | Priority | Oct. 11, 1967 |
| [33] | | Great Britain |
| [31] | | 46449/67 |

[54] VARIABLE SPEED TRANSMISSION FOR AUTOMOTIVE VEHICLES
8 Claims, 3 Drawing Figs.

[52] U.S. Cl. .............................................. 74/759,
29/159.2
[51] Int. Cl. ........................................... F16h 57/10,
B21k 1/30
[50] Field of Search ........................................ 74/759;
29/159.2

[56] References Cited
UNITED STATES PATENTS

| 1,481,212 | 1/1924 | Keller | 29/159.2 |
| 2,654,944 | 10/1953 | Wilson | 29/159.2 |
| 2,856,794 | 10/1958 | Simpson | 74/763 |
| 2,931,094 | 5/1960 | Teerlink | 29/159.2 |
| 3,067,632 | 12/1962 | Foerster et al. | 74/759 |
| 3,091,981 | 6/1963 | Peras | 74/759 |
| 3,206,840 | 9/1965 | Carlson | 29/159.2 |
| 3,299,739 | 1/1967 | Stockton | 74/677 |
| 3,371,557 | 3/1968 | Lammert | 74/688 |

FOREIGN PATENTS

| 743,814 | 1/1956 | Great Britain | 74/759 |
| 903,963 | 10/1945 | France | 29/159.2 |

*Primary Examiner*—Arthur T. McKeon
*Attorney*—Robert L. Zeig

ABSTRACT: The Specification describes a variable speed hydraulically operated transmission for an automotive vehicle including three epicyclic gear sets. Control of gear change is effected by hydraulically operated brakes and clutches. Most of the components of the brakes and clutches are formed as steel pressings. This reduces the bulk weight and cost of the transmission.

Inventors
CARL W. HANZI
JAMES M. LAING
By Robert L. Zieg
Attorney

Inventors
CARL W. HANZI
JAMES M. LAING
By Robert L. Zieg
Attorney

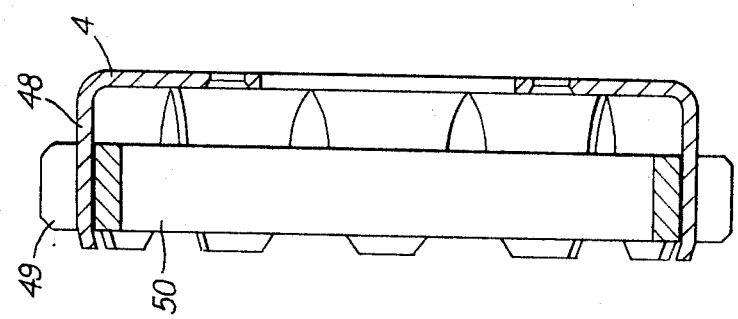
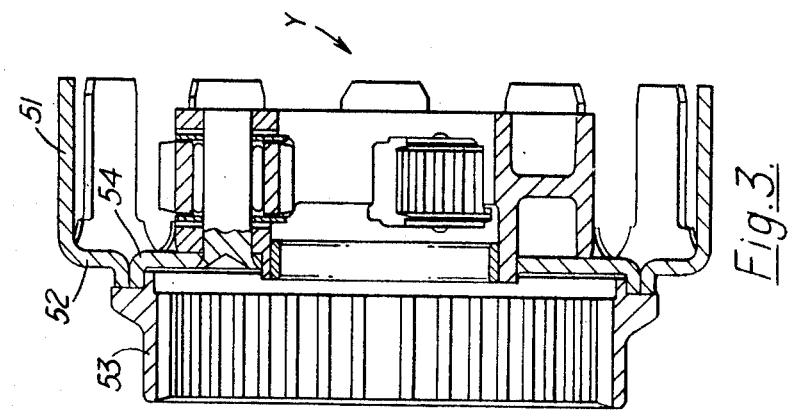
Fig. 3.
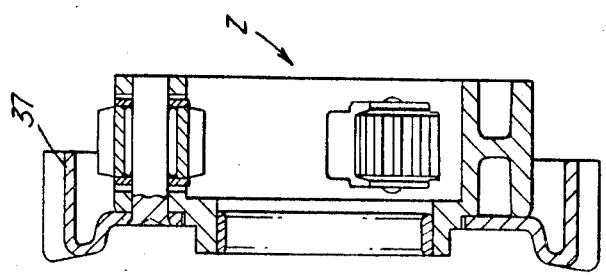
Inventors
CARL W. HANZI
JAMES M. LAING
By Robert L. Zieg
Attorney

VARIABLE SPEED TRANSMISSION FOR AUTOMOTIVE VEHICLES

The present invention relates to variable-speed transmissions for automotive vehicles, such as motor cars, in which one or more trains of epicyclic gears are controlled by the operation of hydraulic clutches and/or brakes to effect the change from one gear ratio to another.

According to the present invention we provide a variable-speed hydraulically operated transmission for an automotive vehicle, comprising at least one epicyclic gear set, a drive member connected to drive one of the components of the gear set, a clutch the input of which is connected to said drive member and the output of which is connected to another component of said gear set, so that upon engagement of said clutch a gear change is effected, said clutch including a first unitary pressed steel drum having an outer cylindrical wall, with a plurality of circumferentially spaced keying means formed in said outer wall during the pressing thereof, a piston axially slidable within said cylindrical wall, one set of clutch plates axially slidable within said cylindrical wall and engaging said keying means of said outer wall, a second unitary pressed steel drum having a peripheral cylindrical wall extending concentrically within said outer cylindrical wall, with a plurality of circumferentially spaced keying means formed in the said peripheral wall, during pressing thereof, and a second set of clutch plates axially slidable within said outer wall and engaging said keying means of said peripheral wall, whereby axial movement of said piston causes engagement or disengagement of said clutch.

It has hitherto been customary to form the drums or cylinders of the clutches of such a transmission from machined material, or from cast or sintered metal, and this makes the production of these components extremely expensive. By making these components of pressed steel, according to the invention, the production costs of such an automatic transmission can be reduced substantially.

Preferably more than one clutch is provided, the pressings of these clutches are identical, so that the dies used in the pressings may be reduced in number.

With a preferred construction according to the present invention, a transmission may be constructed to have four forward speeds and one reverse speed, the bulk, weight and cost of which is less than that of a comparable known type of transmission having only three forward speeds.

In order that the invention may more readily be understood, the following description is given, merely by way of example, reference being made to the accompanying drawings, in which:

FIG. 3 is an exploded side elevation, in full section, of the front and middle planet carrier assembly, parking lock and rear planet carrier assembly of the transmission of FIG. 1.

Figure 1:
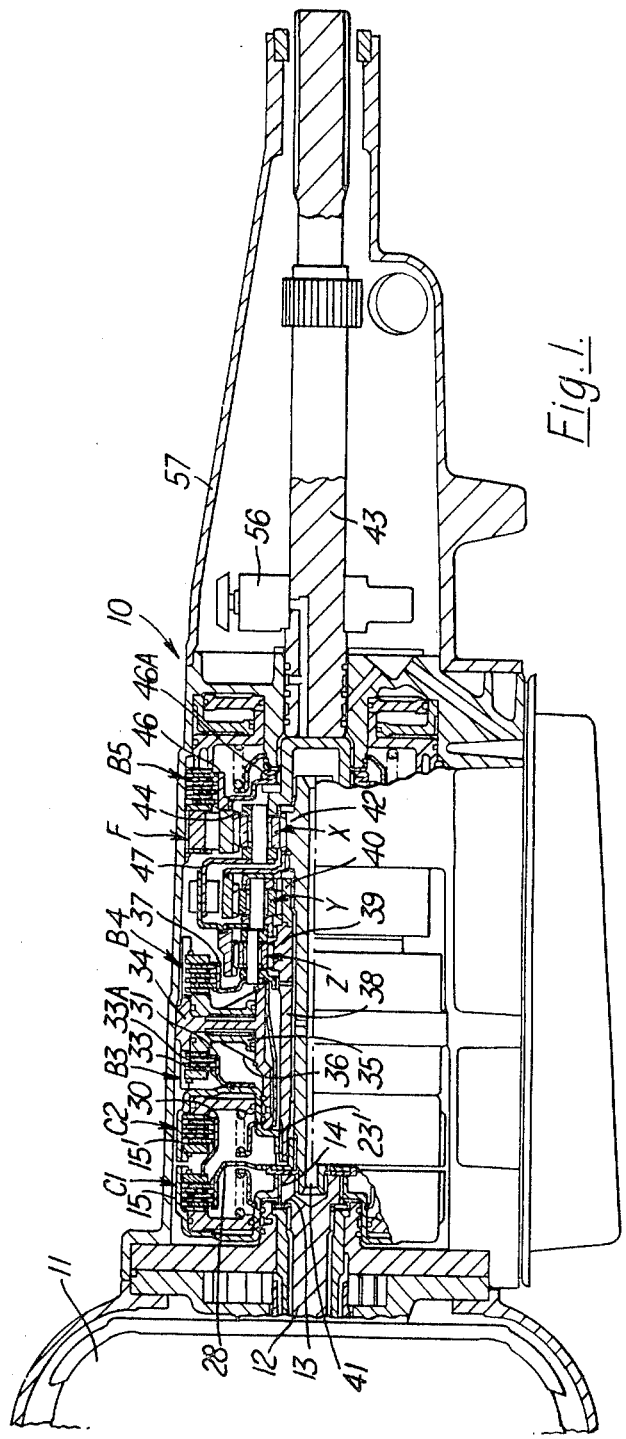
FIG. 1 is a schematic side elevation of one embodiment of transmission according to the invention, and illustrated in half-section.

Referring now to FIG. 1 of the drawings, there is illustrated one embodiment of transmission 10 according to the invention, which is connected to a torque converter 11, the input of which, in turn, is connected to the drive shaft of an engine (not shown). The input or drive shaft 12 of the transmission, which is connected to the output of the torque converter, is rotatable in bearings 13, and is splined at 14.

Figure 2:
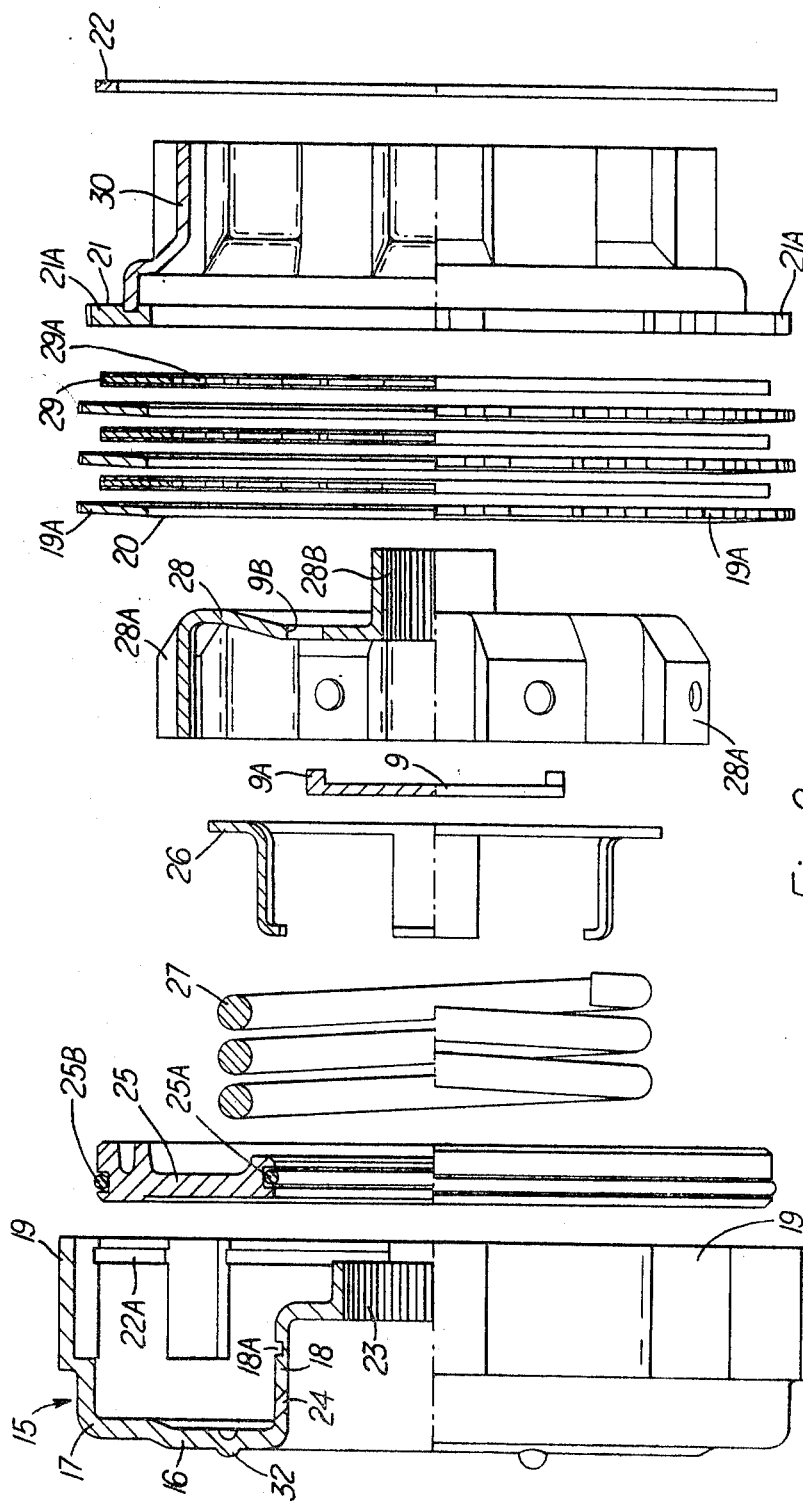
FIG. 2 is an exploded side elevation, in half-section, of the front clutch of the transmission of FIG. 1.

Mounted on these splines is the drum or cylinder 15 of the first clutch C1 of the transmission. The actual form of this cylinder is more clearly illustrated in the exploded view of FIG. 2, from which it can be seen that the drum comprises a radial wall 16 and an outer cylindrical wall 17 and an inner cylindrical hub 18. The outer cylindrical wall 17 is provided with six equally circumferentially spaced keying lugs 19, which serve to accommodate radially projecting lugs 19A of input clutch plates 20 of the first clutch. The lugs 19 are formed during pressing of the drum so as to be bridge shaped, or inverted U-shaped pressed out portions, as viewed from the right in FIG. 2, which are connected to the cylindrical outer wall 17 on all sides, except the side appearing on the right in FIG. 2. Thus, the clutch plates 19 can slide in from the right to take up the position illustrated in FIG. 1.

Also located within the cylindrical portion 17 of the drum is a reaction member 21, which is also provided with radial projections 21A engaging in the keying portions 19. This reaction member is held in place by a snapring 22 retained in an annular groove 22A which is formed in the cylindrical wall 17 during pressing thereof.

The hub 18 is provided with a stepped portion, the inner surface of which is swaged, during the pressing operation, to form splines 23 for engagement on the splined portion 14 of the input shaft 12. Adjacent the point where the hub 18 joins the radial wall 16 there is drilled an oblique aperture 24, for the admission of a hydraulic fluid for the movement of an annular die-cast aluminum piston 25, which is provided, in its innner and outer cylindrical surfaces, with grooves to accommodate O-rings 25A and 25B, which seal against the hub 18 and the cylindrical wall 17. Formed in the hub 18, during pressing thereof, is an annular groove 18A which accommodates radially inwardly projecting portions of a spring retainer 26 and between the retainer 26 and the piston 25 is located a coil compression spring 27 which tends to urge the piston 25 towards the left in FIG. 1.

An output drum 28 concentrically mounted with respect to the drum 15 carries clutch plates 29, which are interleaved with the clutch plate 20 carried by the drum 15. Eight spaced-apart keying means 28A, which are formed in a similar manner to the keying means 19 of the drum 15, engage inwardly directed projections 29A of the output clutch plates 29. Splines 28B are formed on the hub of the output drum 28. Located between the end of the spline portion 23 of the drum 15, and the radial wall of the drum 28, is a spacer ring 9 which is keyed by projecting portions 9A engaging in recesses 9B in the radial wall of the drum 28.

Mounted adjacent the clutch C1 is a clutch C2, the drum, piston, clutch spring, clutch plates and clutch spring retaining member of which are of identical construction to those of the clutch C1, the only difference being that they are mounted in mirror image relationship. Like parts of the clutches C1 and C2 are referred to with the same reference numerals, except that the components of clutch C2 are illustrated with a prime.

Connection between the clutch C1 and the clutch C2 is effected by an annular transfer drum 30, which is again a pressing, this carrying the input plates of the clutch C2, the output plates being carried by the drum 15'. Carried on the right-hand face, i.e. on the annular end wall of the drum 15', is a further drum 31 forming the movable input member of a plate clutch-type brake B3. Both the transfer member 30 and the input drum 31 of the brake B3 are formed as pressings, having keying means similar to those of the drum 15 produced during the pressing operation. The drum 31 is secured to the drum 15' by means of projection welds effected with the assistance of projections 32 (see FIG. 2) formed on the drum 15' during the pressing operation thereof.

Movable clutch plates 33A, which are similar to the clutch plates 29, are mounted on the drum 31 and are interleaved with stationary clutch plates 33, which again are similar to the clutch plates 20. Clutch plates 33 are carried by a die-cast aluminum support 34 keyed to the casing of the transmission. To effect engagement of the plates 33 and 33A of the brake B3 is an operating piston 35 formed as an aluminum die-casting and provided with sealing O-rings similar to those of the clutches C1 and C2. The piston 35 is urged by a Belleville-type spring 36 to the retracted position. Location of the plates 33 and 33A is effected by means of a reaction member and a snapring in a manner similar to that of clutches C1 and C2. The casting 34 also extends to the right in generally similar form to that described to form a second brake B4, further discussion of which is believed not to be necessary. The movable clutch plates of the brake B4 are carried by a further pressed steel drum 37.

The output drum 28 of the first clutch C1 drives the sun gear of an epicyclic gear set X, and the splines 23' on the drum 15' of the second clutch C2 drives the sun gear of a further epicyclic gear set Z and also that of a further gear set Y. As can be seen from FIG. 1, this drive is effected by a tubular shaft 38 driving the sun gear 39 of the gear set Z which in turn is keyed to the sun wheel 40 of the gear set Y. Within the shaft 38 is disposed a shaft 41 which drives the sun wheel 42 of gear set X. The output shaft 43 of the transmission is connected to form the planet carrier 44 of gear set X, the annulus 45 of which is connected, via a one way or sprag clutch F, which is arranged parallel to a clutch plate-type brake B5, to the frame of the transmission. A pressed steel annular drum 46 carries the movable plates of the brake B5, the inner portion of the drum 46 being undulated at 46A to form a spacer between the casing and an adjacent bearing of the output shaft 43.

At the left-hand end, as viewed in FIG. 1, of gear set X, a pressed sheet metal annular member 47 is provided, during the pressing operation, with axially extending circumferentially Spaced-apart annular fingers 48, as can be seen in FIG. 3. These fingers 48 engage in circumferentially spaced notches 49 in a park-locking ring 50. Also engaged in these notches 49 of the locking ring 50 are similarly formed fingers 51 of a further annular drum 52 which has been electron beam welded to the annulus 53 of the gear set Z. Also electron beam welded to the annulus 53 is the planet pinion carrier 54 of the gear set Y.

The part-locking ring 50 extends radially outwardly a short distance beyond the fingers 51 of the drum 52, and a parking pawl (not shown) secured to the casing of the transmission, can engage in the notches 49 to lock the output of the transmission in the customary manner. As can be seen, epicyclic gear set X is provided with four planet pinions, since its load is greater than that of the gear sets Y and Z, which each are provided with only three planet pinions.

Referring again to FIG. 1, it can be seen that the drum 37 only serves to carry the moving plates of the brake B4, but also serves as the planet pinion carrier of the epicyclic gear set Z.

As has been indicated previously, many of the components of this transmission are formed as pressings from sheet steel. By way of example, the method of manufacturing the drums 15 of the clutches C1 and C2 has the following sequence of steps. A blank is cut out from a sheet of steel and is then rough cupped or drawn to produce the inner and outer cylindrical shapes of the outer cylindrical wall and the hub. Final sizing in the die is a next step which results in final sizing of the radial dimensions of the hub and outer cylindrical wall. The lugs 19 which form the keying means are then pressed out accurately to the desired configuration, and subsequently the center hole of the drum is made and the spines 23 are formed. The final step in the pressing operation is the rolling of the grooves 22A and 18A. Later drilling of the hole 24 is effected, this being the only operation which need not be effected during the pressing of this drum. Similar operations will be carried out to manufacture the other pressed components.

As can be seen in FIG. 1, a conventional type of governor 56 is mounted within an extension 57 which accommodates the output shaft 43.

In operation of the above-described transmission, the following table illustrates which clutches and brakes have to engage to achieve the various gear ratios.

|  | C1 | C2 | B3 | B4 | B5 | F |
|---|---|---|---|---|---|---|
| 1st gear | X |  |  |  |  | X |
| 2nd gear | X |  |  |  | X |  |
| 3rd gear | X |  |  | X |  |  |
| 4th gear | X | X |  |  |  |  |
| Reverse |  | X |  |  | X |  |

The mode of operation of the clutches and brakes in response to the setting of the manual control of the vehicle, vehicle speed and loading are conventional and need not be described herein.

We claim:
1. A variable-speed hydraulically operated transmission for an automotive vehicle, said transmission comprising in combination:
 a. at least one epicyclic gear set;
 b. drive means connected to drive said gear set;
 c. a clutch having an input and an output, said input connected to said drive means, said output connected to said gear set whereby, upon engagement of said clutch a gear change of said transmission is effected;
 d. said clutch including:
  aa. a first unitary annular pressed steel drum forming an annular cylinder;
  bb. said drum including an outer cylindrical wall and an inner cylindrical wall;
  cc. said outer cylindrical wall including a plurality of circumferentially spaced keying means;
  dd. a piston axially slidable within said annular cylinder;
  ee. a set of clutch plates axially slidable within said annular cylinder and engaging said keying means of said outer cylindrical wall;
  ff. a second unitary pressed steel drum;
  gg. a peripheral cylindrical wall on said second drum extending concentrically within said annular cylinder;
  hh. said peripheral wall including a plurality of circumferentially spaced keying means; and
  ii. a second set of clutch plates axially slidable within said annular cylinder and engaging said keying means of said outer wall, whereby axial movement of said piston causes engagement or disengagement of said clutch to drivingly connect and disconnect respectively said drive means and said gear set.

2. The transmission claimed in claim 1, wherein first unitary pressed steel drum comprises a cylindrical hub member concentric with said outer wall; wherein said piston is annular and is slidable between said hub member and outer wall; said inner cylindrical wall includes an annular groove, spring retainer means of unitary pressed steel construction engaging said annular groove; and a spring engaged between said annular piston and said retainer means.

3. The transmission claimed in claim 2, wherein said drive means comprises a drive shaft, wherein splines are formed on said drive shaft, said first drum including an annular hub, said hub including splines, said splines on said hub and drive cooperating with one another.

4. The transmission claimed in claim 1, wherein said outer cylindrical wall includes an annular groove, an annular reaction member received within said outer cylindrical wall, keys formed on said reaction member engaging said keying means and an annular clip engaged in said annular groove in said outer cylindrical wall, effective to return said reaction member and said clutch plates in said first drum.

5. The transmission claimed in claim 4, and further comprising a second clutch, an input drum for said second clutch welded to said reaction member, a cylindrical wall on said input drum, keying means formed on said input drum cylindrical wall effective to engage the input plates of said second clutch.

6. The transmission claimed in claim 5, wherein the remaining components of said second clutch are identical to those of the clutch connected to said drive means.

7. The transmission claimed in claim 6, and further including a radial wall on each of said first drum of said clutches, axial projections formed on said radial walls, a first brake adjacent said second clutch, an input drum to said first brake, said input drum projection welded to said axial projection of said first drum of said second clutch.

8. The transmission claimed in claim 1, wherein said keying means comprise outwardly pressed bridge-shaped lugs on the cylindrical wall of the associated drum.

UNITED STATES PATENT OFFICE
CERTIFICATE OF CORRECTION

Patent No. 3,587,347  Dated June 28, 1971

Inventor(s) Carl W. Hanzi et al.

It is certified that error appears in the above-identified patent and that said Letters Patent are hereby corrected as shown below:

Column 4, lines 35 to 38, cancel "first unitary pressed steel drum comprises a cylindrical hub member concentric with said outer wall; wherein said piston is annular and is slidable between said hub member and outer wall".

Signed and sealed this 16th day of May 1972.

(SEAL)
Attest:

EDWARD M. FLETCHER, JR.
Attesting Officer

ROBERT GOTTSCHALK
Commissioner of Patents